United States Patent
Uozumi et al.

(10) Patent No.: US 11,225,536 B1
(45) Date of Patent: Jan. 18, 2022

(54) METHOD FOR PRODUCING SOLID CATALYST COMPONENT FOR POLYMERIZATION OF OLEFIN, SOLID CATALYST COMPONENT FOR POLYMERIZATION OF OLEFIN, CATALYST FOR POLYMERIZATION OF OLEFIN, METHOD FOR PRODUCING CATALYST FOR POLYMERIZATION OF OLEFIN AND METHOD FOR PRODUCING POLYMER OF OLEFIN

(71) Applicant: TOHO TITANIUM CO., LTD., Chigasaki (JP)

(72) Inventors: Toshiya Uozumi, Chigasaki (JP); Teppei Ishikawa, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 0 days.

(21) Appl. No.: 16/931,971

(22) Filed: Jul. 17, 2020

(51) Int. Cl.
  *C08F 110/06* (2006.01)
(52) U.S. Cl.
  CPC .................................. *C08F 110/06* (2013.01)
(58) Field of Classification Search
  CPC ........ C08L 110/06; C08L 10/00; C08L 4/651; C08L 4/6465; C08L 4/6548; C08F 110/06; C08F 10/06; C08F 10/00; C08F 4/651; C08F 4/6465; C08F 4/6548
  USPC .......................................... 524/574; 526/170
  See application file for complete search history.

(56) References Cited

U.S. PATENT DOCUMENTS

2005/0267272 A1* 12/2005 Kumamoto ............. C08F 10/00
  526/129

FOREIGN PATENT DOCUMENTS

| JP | S56-000811 A | 1/1981 |
| JP | S58-083006 A | 5/1983 |
| JP | S63-3010 A | 1/1988 |
| JP | 2009-263678 A | 11/2009 |

\* cited by examiner

*Primary Examiner* — William K Cheung
(74) *Attorney, Agent, or Firm* — Westerman, Hattori, Daniels & Adrian, LLP

(57) ABSTRACT

A solid catalyst component for polymerization of an olefin having a polymerization activity equivalent to or higher than a solid catalyst component having a phthalic acid ester compound or diether compound as an internal electron-donating compound, and can produce an olefin polymer having excellent bulk density and low content of olefin oligomers. A solid catalyst component for polymerization of an olefin is obtained by: (i) bringing compounds selected from particular phthalic acid ester compounds (A), a magnesium compound and a halogen-containing titanium compound into contact; (ii) bringing the first contact product obtained in step (i) and compounds selected from particular diether compounds (B) into contact, and washing the second contact product; and (iii) obtaining a contact product between the washed second contact product and a halogen-containing titanium compound, washing the contact product, and bringing it into contact with particular phthalic acid ester compounds (A) and a halogen-containing titanium compound.

6 Claims, No Drawings

METHOD FOR PRODUCING SOLID CATALYST COMPONENT FOR POLYMERIZATION OF OLEFIN, SOLID CATALYST COMPONENT FOR POLYMERIZATION OF OLEFIN, CATALYST FOR POLYMERIZATION OF OLEFIN, METHOD FOR PRODUCING CATALYST FOR POLYMERIZATION OF OLEFIN AND METHOD FOR PRODUCING POLYMER OF OLEFIN

TECHNICAL FIELD

The present invention relates to a method for producing a solid catalyst component for polymerization of an olefin, a solid catalyst component for polymerization of an olefin, a catalyst for polymerization of an olefin, a method for producing a catalyst for polymerization of an olefin and a method for producing a polymer of an olefin.

BACKGROUND ART

In polymerization of an olefin such as propylene, a solid catalyst component comprising magnesium, titanium, halogen and an electron-donating compound as essential components has conventionally been known. In addition, a number of methods for polymerizing or copolymerizing olefins in the presence of a catalyst for polymerization of an olefin formed of such a solid catalyst component, an organoaluminum compound and an organosilicon compound have been proposed.

Among these catalysts for polymerization of an olefin, it has been reported that excellent polymerization activity and stereospecificity are exhibited in a case where a solid titanium catalyst component (solid catalyst component) having an internal electron-donating compound, typical examples of which include a phthalic acid ester in particular, carried thereon; and an organoaluminum compound and a silicon compound containing at least one Si—OR (wherein R is a hydrocarbon group) bond as promoter components are used (Patent Literature 1, Patent Literature 2 and Patent Literature 3). In addition to the Patent Literatures described above, there have been a number of reported examples in which it is preferable to use a phthalic acid ester as an electron-donating compound.

Moreover, a solid catalyst component using a particular 1,3-diether compound as an internal electron-donating compound has been reported (Patent Literature 4).

On the other hand, in recent years, volatile organic compounds (VOCs) such as olefin oligomers generated from polypropylene resins used in interior members for automobiles and the like have caused bad odors, and there has been a growing demand for a catalyst for polymerization of an olefin that can readily produce a polymer of an olefin that can suppress generation of VOCs.

However, no solid catalyst component has been reported that has a polymerization activity equivalent to or higher than that of the case using a conventional solid catalyst component in which a phthalic acid ester compound or diether compound is used as an internal electron-donating compound, and that can produce an olefin polymer with an excellent bulk density and a low content of olefin oligomers.

CITATION LIST

Patent Literature

[Patent Literature 1] Japanese Patent Laid-Open No. 58-83006
[Patent Literature 2] Japanese Patent Laid-Open No. 56-811
[Patent Literature 3] Japanese Patent Laid-Open No. 63-3010
[Patent Literature 4] Japanese Patent Laid-Open No. 2009-263678

SUMMARY OF INVENTION

Technical Problem

Under such circumstances, the present invention aims to provide a solid catalyst component for polymerization of an olefin that has a polymerization activity equivalent to or higher than that of the case using a conventional solid catalyst component in which a phthalic acid ester compound or diether compound is used as an internal electron-donating compound, and that can produce an olefin polymer with an excellent bulk density and a low content of olefin oligomers, and also aims to provide a method for producing a solid catalyst component for polymerization of an olefin, a catalyst for polymerization of an olefin, a method for producing a catalyst for polymerization of an olefin and a method for producing a polymer of an olefin.

Solution to Problem

As a result of diligent researches in order to solve the technical problems described above, the present inventors have found that the technical problems described above can be solved by a solid catalyst component for polymerization of an olefin, obtained by sequentially performing the following steps:

(i) a first step of bringing one or two or more compounds selected from particular phthalic acid ester compounds (A), a magnesium compound and a halogen-containing titanium compound into contact with each other, thereby obtaining a first contact product;

(ii) a second step of further bringing the first contact product obtained in the above step (i) and one or two or more compounds selected from particular diether compounds (B) into contact with each other, and then washing the obtained second contact product; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product.

The above finding has led to the completion of the present invention.

That is, the present invention is to provide the followings:
(1) A method for producing a solid catalyst component for polymerization of an olefin, comprising the following steps sequentially performed:

(i) a first step of bringing one or two or more compounds selected from phthalic acid ester compounds (A) represented by the following general formula (1), a magnesium compound and a halogen-containing titanium compound into contact with each other, thereby obtaining a first contact product:

$$(R^1)_k C_6 H_{4-k}(COOR^2)(COOR^3) \quad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;

(ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

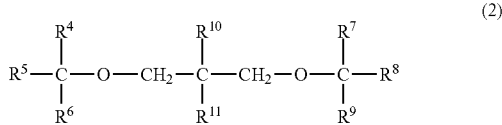

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product;

(2) A solid catalyst component for polymerization of an olefin, obtained by sequentially performing the following steps:

(i) a first step of bringing one or two or more compounds selected from phthalic acid ester compounds (A) represented by the following general formula (1), a magnesium compound and a halogen-containing titanium compound into contact with each other, thereby obtaining a first contact product:

$$(R^1)_k C_6 H_{4-k}(COOR^2)(COOR^3) \quad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;

(ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

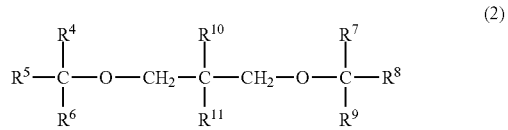

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product;

(3) The solid catalyst component for polymerization of an olefin according to the above item (2), wherein:

the solid catalyst component for polymerization of an olefin comprises titanium, magnesium, halogen and an internal electron-donating compound;

the internal electron-donating compound comprises one or two or more compounds selected from phthalic acid ester compounds (A) represented by the following general formula (1):

$$(R^1)_k C_6 H_{4-k}(COOR^2)(COOR^3) \quad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, each $R^1$ may be the same as or different from each other, and one or two or more compounds selected from diether compounds (B) represented by the following general formula (2):

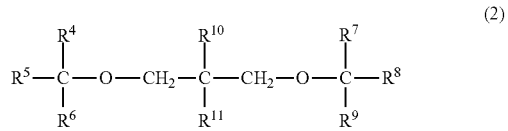

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and RU each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;

the total amount of the phthalic acid ester compounds (A) and the diether compounds (B) per g of the solid catalyst component for polymerization of an olefin is 0.5 to 1.2 mmol; and the ratio represented by the entire molar amount of the phthalic acid ester compounds (A)/the entire molar amount of the diether compounds (B) is 0.5 to 1.2; (4) A catalyst for polymerization of an olefin, comprising:

(I) the solid catalyst component for polymerization of an olefin according to claim 2; and (II) one or two or more organoaluminum compounds selected from the following general formula (3):

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other;
(5) The catalyst for polymerization of an olefin according to the above item (4), comprising:

(I) the solid catalyst component for polymerization of an olefin according to the above item (2);

(II) one or two or more organoaluminum compounds selected from the following general formula (3):

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other; and (III) an external electron-donating compound;
(6) The catalyst for polymerization of an olefin according to the above item (5), wherein (III) the external electron-donating compound is one or two or more selected from:

diether compounds (B) represented by the following general formula (2):

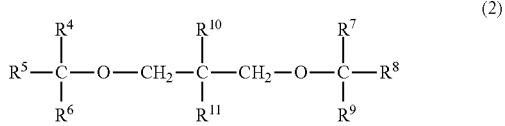

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;

organosilicon compounds represented by the following general formula (4):

wherein $R^{13}$ represents any of an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms and a dialkylamino group having 1 to 12 carbon atoms; q is an integer of $0 \leq q \leq 3$ and when q is 2 or more, a plurality of $R^{13}$ may be the same as or different from each other; and $R^{14}$ represents an alkyl group having 1 to 4 carbon atoms, a cycloalkyl group having 3 to 6 carbon atoms, a phenyl group, a vinyl group, an allyl group or an aralkyl group, and when a plurality of $R^{14}$ is present, a plurality of $R^{14}$ may be the same as or different from each other; and organosilicon compounds represented by the following general formula (5):

$$(R^{15}R^{16}N)_s SiR^{17}_{4-s} \qquad (5)$$

wherein $R^{15}$ and $R^{16}$ each represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, and may be the same as or different from each other, or may be bonded to each other to form a ring; $R^{17}$ represents a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group and a derivative thereof, and when a plurality of $R^{17}$ is present, a plurality of $R^{17}$; may be the same as or different from each other; and s is an integer of 1 to 3, and a plurality of the $R^{15}R^{16}N$ groups is present, a plurality of the $R^{15}R^{16}N$ groups may be the same as or different from each other;
(7) A method for producing a catalyst for polymerization of an olefin, wherein a contact product is obtained by bringing the followings into contact with each other:

(I) the solid catalyst component for polymerization of an olefin according to the above item (2); and (II) one or two or more organoaluminum compounds selected from the following general formula (3):

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q is a hydrogen atom or halogen, and when a plurality of Q is present, a plurality of Q may be the same as or different from each other; and
(8) A method for producing a polymer of an olefin, wherein polymerization of an olefin is carried out by using the catalyst for polymerization of an olefin according to any of the above item (4) to item (6).

Note that, hereinafter, the solid catalyst component for polymerization of an olefin will be referred to as a solid catalyst component, as appropriate.

Advantageous Effects of Invention

According to the present invention, a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided, and a method for producing a solid catalyst component for polymerization of an olefin, a catalyst for polymerization of an olefin, a method for producing a catalyst for polymerization of an olefin and a method for producing a polymer of an olefin can also be provided.

DESCRIPTION OF EMBODIMENTS

At first, a method for producing a solid catalyst component for polymerization of an olefin according to the present invention will be described.

The method for producing a solid catalyst component for polymerization of an olefin according to the present invention is characterized in that the following steps are sequentially performed:

(i) a first step of bringing one or two or more compounds selected from phthalic acid ester compounds (A) represented by the following general formula (1), a magnesium compound and a halogen-containing titanium compound into contact with each other, thereby obtaining a first contact product:

$$(R^1)_kC_6H_{4-k}(COOR^2)(COOR^3) \tag{1}$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;

(ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

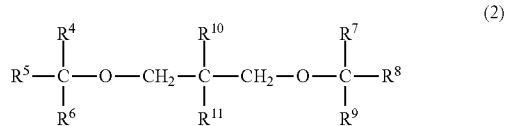

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product.

In phthalic acid ester compounds (A) represented by the following general formula (1):

$$(R^1)_kC_6H_{4-k}(COOR^2)(COOR^3) \tag{1}$$

$R^1$ is an alkyl group having 1 to 8 carbon atoms or a halogen atom.

When $R^1$ is an alkyl group having 1 to 8 carbon atoms, the alkyl group having 1 to 8 carbon atoms may be either linear or branched chain, and examples thereof include, for example, a methyl group, an ethyl group, a n-propyl group, an iso-propyl group, a n-butyl group, an iso-butyl group, a t-butyl group, a n-pentyl group, an iso-pentyl group, a neopentyl group, a n-hexyl group, a n-heptyl group and a n-octyl group.

When $R^1$ is a halogen atom, examples of the halogen atom include, for example, fluorine, chlorine, bromine and iodine. Among the above, chlorine, bromine or iodine is preferable, and chlorine or bromine is more preferable.

The number of the substituent $R^1$, k, is 0, 1 or 2, and when k is 2, a plurality of $R^1$ may be the same as or different from each other.

In phthalic acid ester compounds (A) represented by the general formula (1), $R^2$ and $R^3$ are each an alkyl group having 1 to 12 carbon atoms and may be the same as or different from each other.

The alkyl group having 1 to 12 carbon atoms may be either linear or branched chain, and examples thereof include, for example, a methyl group, an ethyl group, a n-propyl group, an iso-propyl group, a n-butyl group, an iso-butyl group, a t-butyl group, a n-pentyl group, an iso-pentyl group, a neopentyl group, a n-hexyl group, a n-heptyl group, a n-octyl group, a n-nonyl group, a n-decyl group, a n-undecyl group and a n-dodecyl group.

Examples of the phthalic acid ester compounds (A) represented by the general formula (1) include dimethyl phthalate, diethyl phthalate, di-n-propyl phthalate, di-iso-propyl phthalate, di-n-butyl phthalate, di-iso-butyl phthalate, di-n-butyl bromophthalate, di-iso-propyl methylphthalate, di-iso-butyl diethylphthalate, ethyl n-butyl phthalate, ethyl iso-butyl phthalate, ethyl n-propyl phthalate and n-propyl n-butyl phthalate.

Among the above, diethyl phthalate, di-n-propyl phthalate, di-iso-propyl phthalate, di-n-butyl phthalate or di-iso-butyl phthalate is preferable.

One of these phthalic acid ester compounds (A) may be used singly, or two or more of them may be used in combination.

Examples of the magnesium compound used in the first step include one or two or more selected from a magnesium dihalide, a dialkylmagnesium, an alkylmagnesium halide, a dialkoxymagnesium, a diaryloxymagnesium, an alkoxymagnesium halide and a fatty acid magnesium.

Among the above, a magnesium dihalide, a mixture of a magnesium dihalide and a dialkoxymagnesium, or a dialkoxymagnesium is preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium and butoxyethoxymagnesium. In addition, these dialkoxymagnesiums may be prepared by allowing magnesium metal to react with an alcohol in the presence of halogen, a halogen-containing metal compound or the like. Moreover, one of the above dialkoxymagnesiums may be used singly, or two or more of them may be used in combination.

Furthermore, in the method for producing a solid catalyst component for polymerization of an olefin according to the present invention, when a dialkoxymagnesium is used as the magnesium compound, it is preferably in a granular or powdery form, and that having an amorphous or spherical shape can be used. For example, when a dialkoxymagnesium having a spherical shape is used, the resulting polymer powder has a better particle shape and a narrower particle size distribution upon polymerization, the handling operability of the produced polymer powder upon polymerization operation is improved, and problems such as clogging caused by fine powder contained in the produced polymer powder are solved.

Examples of the halogen-containing titanium compound used in the first step include, for example, tetravalent titanium compounds represented by the following general formula (6):

$$Ti(OR^{18})_j X_{4-j} \quad (6)$$

wherein $R^{18}$ represents a hydrocarbon group having 1 to 10 carbon atoms; when a plurality of the $OR^{18}$ groups is present, a plurality of $R^{18}$ may be the same as or different from each other; X represents a halogen group, and when a plurality of X is present, a plurality of X may be the same as or different from each other; and j is an integer of 0 or 1 to 4.

Examples of the tetravalent titanium compounds represented by the above general formula (6) include one or two or more selected from the group of an alkoxytitanium, a titanium halide and an alkoxytitanium halide.

Specific examples of the tetravalent titanium compounds described above include a titanium tetrahalide such as titanium tetrafluoride, titanium tetrachloride, titanium tetrabromide and titanium tetraiodide, and examples of the alkoxytitanium halide include an alkoxytitanium trihalide such as methoxytitanium trichloride, ethoxytitanium trichloride, propoxytitanium trichloride and n-butoxytitanium trichloride; a dialkoxytitanium dihalide such as dimethoxytitanium dichloride, diethoxytitanium dichloride, dipropoxytitanium dichloride and di-n-butoxytitanium dichloride; a trialkoxytitanium halide such as trimethoxytitanium chloride, triethoxytitanium chloride, tripropoxytitanium chloride and tri-n-butoxytitanium chloride.

Among the above, a halogen-containing titanium compound is preferable, a titanium tetrahalide such as titanium tetrachloride, titanium tetrabromide and titanium tetraiodide is particularly preferable, and titanium tetrachloride is most preferable.

One of these titanium compounds may be used singly, or two or more of them may be used in combination. Furthermore, these tetravalent titanium compounds represented by the general formula (6) may be diluted in a hydrocarbon compound, a halogenated hydrocarbon compound or the like for use.

In the first step, it is preferable that the treatment of bringing the phthalic acid ester compounds (A), the magnesium compound and the halogen-containing titanium compound into contact be carried out in the presence of an inert organic solvent.

As the inert organic solvent described above, an inert organic solvent that is liquid at ordinary temperature (20° C.) and has a boiling point of 50 to 150° C. is preferable; an aromatic hydrocarbon compound or saturated hydrocarbon compound that is liquid at ordinary temperature and has a boiling point of 50 to 150° C. is more preferable; and one or two or more selected from linear hydrocarbon, branched aliphatic hydrocarbon, alicyclic hydrocarbon and aromatic hydrocarbon that are liquid at ordinary temperature and have boiling points of 50 to 150° C. are still more preferable.

Specific examples of the inert organic solvent described above include one or more selected from a linear aliphatic hydrocarbon compound such as hexane, heptane and decane; a branched aliphatic hydrocarbon compound such as methylheptane; an alicyclic hydrocarbon compound such as cyclohexane, methylcyclohexane and ethylcyclohexane; an aromatic hydrocarbon compound such as toluene, xylene and ethylbenzene; and the like.

Among the inert organic solvents described above, an aromatic hydrocarbon compound that is liquid at ordinary temperature and has a boiling point of 50 to 150° C. is suitable because it can improve the activity of the solid catalyst component to be obtained and can improve the stereoregularity of the polymer to be obtained.

In the method for producing a solid catalyst component for polymerization of an olefin of the present invention, the phthalic acid ester compounds (A), the magnesium compound and the halogen-containing titanium compound can be brought into contact in the first step by mixing them in the presence of the inert organic solvent, as appropriate.

In the first step, the phthalic acid ester compounds (A), the magnesium compound and the halogen-containing titanium compound are brought into contact, and are allowed to react, as appropriate.

The temperature upon the contact described above is preferably −20 to 60° C., more preferably −20 to 40° C., still more preferably −10 to 30° C., and further preferably −10 to 20° C. In addition, the contact time is preferably 1 minute or longer, more preferably 10 minutes or longer, still more preferably 30 minutes to 6 hours, further preferably 30 minutes to 5 hours, and even further preferably 1 to 4 hours.

In the first step, upon bringing the phthalic acid ester compounds (A), the magnesium compound and the halogen-containing titanium compound into contact, the amount of the halogen-containing titanium compound to be used relative to 1 mol of the magnesium compound is preferably 0.5 to 100 mol, more preferably 1 to 50 mol, and still more preferably 1 to 10 mol.

In the first step, upon bringing the phthalic acid ester compounds (A), the magnesium compound and the halogen-containing titanium compound into contact, the amount of the phthalic acid ester compounds (A) to be used relative to 1 mol of the magnesium compound is preferably 0.01 to 10 mol, more preferably 0.01 to 1 mol, and still more preferably 0.02 to 0.6 mol.

In addition, when an inert organic solvent is used in the first step, the amount of the inert organic solvent to be used relative to 1 mol of the magnesium compound is preferably 0.001 to 500 mol, more preferably 0.5 to 100 mol, and still more preferably 1.0 to 20 mol.

In the first step, it is preferable that the contact of each component be carried out by stirring them in a vessel equipped with a stirrer, under an inert gas atmosphere and under conditions from which moisture and the like have been removed.

In the method for producing a solid catalyst component for polymerization of an olefin according to the present invention, a second step of further bringing the first contact product obtained in the above first step and one or two or more compounds selected from diether compounds (B) represented by the following general formula (2) into contact with each other, thereby obtaining a second contact product, and then washing the obtained second contact product is performed:

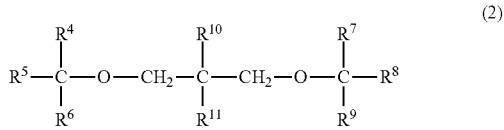

(2)

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring.

In the diether compounds represented by the general formula (2) used in the second step of the method for producing a solid catalyst component for polymerization of an olefin according to the present invention, $R^4$ to $R^9$ are each any of a hydrogen atom, a linear alkyl group having 1 to 6 carbon atoms, a branched alkyl group having 3 to 6 carbon atoms, a cycloalkyl group having 3 to 6 carbon atoms and a phenyl group. May be the same as or different from each other.

When any of $R^4$ to $R^9$ in the general formula (2) is a linear alkyl group having 1 to 6 carbon atoms, examples of the linear alkyl group having 1 to 6 carbon atoms include, for example, a methyl group, an ethyl group, a n-propyl group, a n-butyl group, a n-pentyl group and a n-hexyl group.

When any of $R^4$ to $R^9$ in the above general formula (2) is a branched alkyl group having 3 to 6 carbon atoms, examples of the branched alkyl group having 3 to 6 carbon atoms include, for example, an iso-propyl group, an iso-butyl group, a t-butyl group, an iso-pentyl group, a neopentyl group and an iso-hexyl group.

When any of $R^4$ to $R^9$ in the general formula (2) is a cycloalkyl group having 3 to 6 carbon atoms, examples of the cycloalkyl group having 3 to 6 carbon atoms include, for example, a cyclopropyl group, a cyclobutyl group, a cyclopentyl group, a cyclohexyl group and a phenyl group.

$R^{10}$ and $R^{11}$ in the general formula (2) are each any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other. Alternatively, $R^{10}$ and $R^{11}$ may be bonded to each other to form a ring.

When $R^{10}$ or $R^{11}$ in the general formula (2) is a linear alkyl group having 1 to 6 carbon atoms, a branched alkyl group having 3 to 6 carbon atoms or a cycloalkyl group having 3 to 6 carbon atoms, specific examples thereof include groups that are the same as those exemplified in the description of $R^4$ to $R^9$.

Examples of the diether compounds (B) represented by the general formula (2) include 2-iso-propyl-2-iso-butyl-1,3-dimethoxypropane, 2,2-di-iso-butyl-1,3-dimethoxypropane, 2-iso-propyl-2-iso-pentyl-1,3-dimethoxypropane, 2,2-dicyclohexyl-1,3-dimethoxypropane, 2,2-bis(cyclohexylmethyl)1,3-dimethoxypropane and 9,9-bis(methoxymethyl)fluorene.

Among the above, 2-iso-propyl-2-iso-butyl-1,3-dimethoxypropane, 2,2-di-iso-butyl-1,3-dimethoxypropane, 2-iso-propyl-2-iso-pentyl-1,3-dimethoxypropane or 9,9-bis(methoxymethyl)fluorene is preferable.

One of these diether compounds (B) may be used singly, or two or more of them may be used in combination.

In the method for producing a solid catalyst component for polymerization of an olefin according to the present invention, the first contact product obtained in the first step and the diether compounds (B) are brought into contact, thereby obtaining the second contact product in the second step.

In the second step, the diether compounds (B) can be suitably brought into contact by mixing in the presence of an inert organic solvent that is the same as that exemplified in the first step, as appropriate.

Conditions under which each component is brought into contact and is allowed to react as appropriate in the second step are not particularly limited, but the temperature upon the contact described above is preferably 60 to 200° C., more preferably 60 to 160° C., still more preferably 80 to 140° C., and further preferably 80 to 120° C. In addition, the contact time is preferably 1 minute or longer, more preferably 10 minutes or longer, still more preferably 30 minutes to 6 hours, further preferably 30 minutes to 5 hours, and even further preferably 1 to 4 hours.

In the second step, upon bringing the first contact product obtained in the first step into contact with the diether compounds (B), the molar ratio of the amount of the diether compounds (B) to be used to 1 mol of the magnesium compound (added in the first step) (the molar amount of the diether compounds (B)/the molar amount of the magnesium compound) is preferably 0.001 to 10, more preferably 0.002 to 1, and still more preferably 0.003 to 0.6.

In addition, in the second step, upon bringing the first contact product obtained in the first step into contact with the diether compounds (B), the molar ratio of the amount of the diether compounds (B) to be used to 1 mol of the phthalic acid ester compounds (A) (added in the first step) (the molar amount of the diether compounds (B)/the molar amount of the phthalic acid ester compounds (A)) is preferably 0.01 to 0.9, more preferably 0.01 to 0.6, and still more preferably 0.02 to 0.4.

When the ratio represented as the molar amount of the diether compounds (B)/the molar amount of the phthalic acid ester compounds (A) is within the range described above, it becomes easier to suppress excessive formation of complex compounds formed of the diether compounds (B) and the halogen-containing titanium compound, and upon polymerizing an olefin using the obtained solid catalyst component, the polymerization activity and the stereoregularity can be readily improved.

In addition, when an inert organic solvent is used in the second step, the amount of the inert organic solvent to be used relative to 1 mol of the magnesium compound (added in the first step) is preferably 0.001 to 500 mol, more preferably 0.5 to 100 mol, and still more preferably 1.0 to 20 mol.

Note that, in the method for producing a solid catalyst component for polymerization of an olefin of the present invention, in consideration of the efficiency and the like of the reaction, it is preferable that the magnesium compound be added to the reaction system in the first step in the entirety of the required amount, and it is preferable that the magnesium compound not be added to the reaction system in the second step.

In the second step, it is preferable that the contact of each component be carried out by stirring them in a vessel equipped with a stirrer, under an inert gas atmosphere and under conditions from which moisture and the like have been removed.

After the contact treatment described above is completed, it is preferable to leave the reaction solution to stand and remove the supernatant as appropriate to make it wet (slurry-like), or to further dry it by hot air drying or the like and then carry out a washing treatment.

In addition, in the second step, it is preferable not to use a halogen-containing titanium compound since the halogen-containing titanium compound added in the first step is sufficiently present.

In the second step, after the contact treatment described above is completed, the obtained reaction product is subjected to a washing treatment.

The washing treatment described above is normally carried out using a washing liquid.

Examples of the washing liquid may include those that are the same as the inert organic solvents described above, and one or more selected from a linear aliphatic hydrocarbon compound that is liquid at ordinary temperature and has a boiling point of 50 to 150° C., such as hexane, heptane and decane; a cyclic aliphatic hydrocarbon compound that is liquid at ordinary temperature and has a boiling point of 50 to 150° C., such as methylcyclohexane and ethylcyclohexane; an aromatic hydrocarbon compound that is liquid at ordinary temperature and has a boiling point of 50 to 150° C., such as toluene, xylene, ethylbenzene and ortho-dichlorobenzene; and the like are preferable.

By using the washing liquid described above, byproducts and impurities can be readily dissolved and removed from the reaction products.

In the method for producing a solid catalyst component for polymerization of an olefin according to the present invention, it is preferable to carry out the washing treatment in the second step at a temperature of 0 to 150° C., more preferable to carry out the washing treatment at a temperature of 60 to 150° C., still more preferable to carry out the washing treatment at a temperature of 80 to 130° C., further preferable to carry out the washing treatment at a temperature of 90 to 130° C., and even further preferable to carry out the washing treatment at a temperature of 90 to 120° C.

In the method for producing a solid catalyst component for polymerization of an olefin of the present invention, it is preferable that the washing treatment be carried out by adding a desired amount of the washing liquid to the reaction product, stirring the mixture, and then removing the liquid phase by the filtration method or decantation method.

In addition, as will be mentioned below, when the number of times of washing is multiple times (two or more times), the reaction product may be subjected to the next step as it is without removing the last washing liquid added to the reaction product.

In the second step, the amount of the washing liquid to be used is preferably 1 to 500 mL, more preferably 3 to 200 mL, and still more preferably 5 to 100 mL per g of the second contact product.

The number of times of washing may be multiple times, and the number of times of washing is preferably 1 to 20 times, more preferably 2 to 15 times, and still more preferably 2 to 10 times.

Even when the number of times of washing is multiple times, it is preferable to use the washing liquid at the amount mentioned above for every washing.

In the method for producing a solid catalyst component for polymerization of an olefin according to the present invention, by bringing each component into contact and then subjecting them to the washing treatment in the second step, impurities remaining in the second contact product, such as unreacted raw material components and reaction byproducts (such as an alkoxytitanium halide and a titanium tetrachloride-carboxylic acid complex) can be removed.

After the reaction described above is completed, the suspension after the washing treatment may be left to stand and the supernatant was removed to make the suspension wet (slurry-like) as appropriate, or the resultant may be further dried by hot air drying or the like, or the suspension may be subjected to a third step as is in the state of the suspension. When the suspension is subjected to the third step as is in the state of the suspension, the drying treatment can be omitted and addition of an inert organic solvent in the third step can also be omitted.

In the method for producing a solid catalyst component for polymerization of an olefin according to the present invention, a third step of bringing the washed second contact product described above and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product is performed.

In the method for producing a solid catalyst component for polymerization of an olefin according to the present invention, the details of the phthalic acid ester compounds (A) represented by the general formula (1) and the halogen-containing titanium compound to be brought into contact with the washed second contact product described above are as mentioned above.

The phthalic acid ester compounds (A) and the halogen-containing titanium compound to be brought into contact in the third step may each be the same as or different from those used in the first step.

Conditions under which the halogen-containing titanium compound is brought into contact in the third step are not particularly limited, and specific examples thereof may include contact conditions that are the same as those in the first step.

In the third step, upon bringing the washed second contact product into contact with the halogen-containing titanium compound, thereby obtaining a contact product, the amount of the halogen-containing titanium compound to be used relative to 1 mol of the magnesium compound (added in the first step) is preferably 0.5 to 100 mol, more preferably 1 to 50 mol, and still more preferably 1 to 10 mol.

When an inert organic solvent is used in the third step upon bringing the washed second contact product into contact with the halogen-containing titanium compound, thereby obtaining a contact product, the amount of the inert organic solvent to be used relative to 1 mol of the magnesium compound (added in the first step) is preferably 0.001 to 500 mol, more preferably 0.5 to 100 mol, and still more preferably 1.0 to 20 mol.

In the third step, upon bringing the washed contact product, the phthalic acid ester compounds (A) and the halogen-containing titanium compound into contact with each other, conditions under which the phthalic acid ester compounds (A) and the halogen-containing titanium compound are brought into contact are not particularly limited, and specific examples thereof may include contact conditions that are the same as those in the first step.

In the third step, upon bringing the washed contact product described above into contact with the phthalic acid ester compounds (A), thereby allowing them to react as appropriate, the ratio of the amount of the phthalic acid ester compounds (A) to be used to 1 mol of the magnesium compound (added in the first step) (the molar amount of the phthalic acid ester compounds (A)/the molar amount of the magnesium compound) is preferably 0.001 to 10, more preferably 0.002 to 1, and still more preferably 0.003 to 0.6.

In addition, in the third step, upon bringing the washed contact product described above into contact with the phthalic acid ester compounds (A), the molar ratio of the amount of the phthalic acid ester compounds (A) to be added in the third step to 1 mol of the phthalic acid ester compounds (A) added in the first step (the molar amount of the phthalic acid ester compounds (A) added in the third step/the molar amount of the phthalic acid ester compounds (A) added in the first step) is preferably 0.01 to 0.9, more preferably 0.01 to 0.6, and still more preferably 0.02 to 0.4.

When the ratio represented as the molar amount of the phthalic acid ester compounds (A) added in the third step/the molar amount of the phthalic acid ester compounds (A) added in the first step is within the range described above, it becomes easier to suppress excessive formation of complex compounds formed of the phthalic acid ester compounds (A) added in the third step and the halogen-containing titanium compound, and upon polymerizing an olefin using the obtained solid catalyst component, the polymerization activity and the stereoregularity of the obtained polymer can be readily improved.

In addition, it is preferable that the molar amount of the phthalic acid ester compounds (A) used in the third step be less than the molar amount of the phthalic acid ester compounds (A) used in the first step and be the same as or less than the molar amount of the diether compounds (B) used in the second step.

In other words, it is preferable that the following relationship be satisfied:
the molar amount of the phthalic acid ester compounds (A) used in the first step>the molar amount of the diether compounds (B) used in the second step≥the molar amount of the phthalic acid ester compounds (A) used in the third step.

When an inert organic solvent is used in the third step upon bringing the washed contact product described above into contact with the phthalic acid ester compounds (A) and the halogen-containing titanium compound, thereby obtaining a third contact product, the amount of the inert organic solvent to be used relative to 1 mol of the magnesium compound (added in the first step) is preferably 0.001 to 500 mol, more preferably 0.5 to 100 mol, and still more preferably 1.0 to 20 mol.

In addition, as mentioned above, in the method for producing a solid catalyst component for polymerization of an olefin of the present invention, in consideration of the efficiency and the like of the reaction, it is preferable that the magnesium compound be added to the reaction system in the first step in the entirety of the required amount, and it is preferable that the magnesium compound not be added to the reaction system in the third step.

In the method for producing a solid catalyst component for polymerization of an olefin according to the present invention, by dividing the entire amount of the halogen-containing titanium compound to be used for, for example, the first and third steps, and bringing it to contact part by part, the halogen-containing titanium compound, which can produce a polymer exhibiting high stereoregularity, can be introduced into the solid catalyst component with high efficiency.

In the method for producing a solid catalyst component for polymerization of an olefin according to the present invention, it is preferable to carry out the contact treatment such that the total amount of the phthalic acid ester compounds (A) and the diether compounds (B) per g of the solid catalyst component for polymerization of an olefin to be obtained is 0.5 to 1.2 mmol, more preferable to carry out the contact treatment such that the total amount is 0.6 to 1.2 mmol, and still more preferable to carry out the contact treatment such that the total amount is 0.8 to 1.2 mmol.

In the method for producing a solid catalyst component for polymerization of an olefin according to the present invention, the ratio represented by the entire amount (molar amount) of the phthalic acid ester compounds (A) to be used/the entire amount (molar amount) of the diether compounds (B) to be used is preferably 0.5 to 1.2, more preferably 0.5 to 1.0, and still more preferably 0.5 to 0.8.

In the method for producing a solid catalyst component for polymerization of an olefin according to the present invention, in each step, an additional internal electron-donating compound other than the phthalic acid ester compounds (A) represented by the general formula (1) and the diether compounds (B) represented by the general formula (2) may be used.

Examples of such an additional internal electron-donating compound include an acid halide, an acid amide, a nitrile, an acid anhydride, and an organic acid ester other than the phthalic acid ester compounds (A) such as a succinic acid ester, a maleic acid ester, a malonic acid ester, a glutaric acid ester, a cyclohexanedicarboxylic acid ester and a cyclohexenedicarboxylic acid ester.

One of such additional electron-donating compounds may be used singly, or two or more of them may be used in combination.

The internal electron-donating compound used in the method for producing a solid catalyst component for polymerization of an olefin according to the present invention acts as an electron-donating compound upon preparing the solid catalyst component for polymerization of an olefin.

In the method for producing a solid catalyst component for polymerization of an olefin according to the present invention, a polysiloxane may be used in combination. When the polysiloxane is used, the stereoregularity or the crystallinity of the produced polymer can be improved, and furthermore, fine powder of the produced polymer can be reduced.

The polysiloxane is a polymer having a siloxane bond (—Si—O— bond) in the main chain, and is also generically referred to as a "silicone oil". It is a chain-like, partially hydrogenated, cyclic or modified polysiloxane that is liquid or viscous at ordinary temperature, having a viscosity at 25° C. of 0.02 to 100 cm$^2$/s (2 to 10000 cSt), more preferably 0.03 to 5 cm$^2$/s (3 to 500 cSt).

Examples of the chain-like polysiloxane include dimethylpolysiloxane and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane and 2,4,6,8-tetramethylcyclotetrasiloxane.

In the production method according to the present invention, it is preferable that the solid catalyst component for polymerization of an olefin obtained by performing the third step be made into a powdered solid component by removing the residual solvent until the weight ratio to the solid catalyst component becomes ⅓ or less, preferably 1/20 to ⅙, and that fine powder with a particle diameter of 11 μm or less mixed in the powdered solid component be removed by means of airflow classification or the like.

Specific examples of the method for producing a solid catalyst component for polymerization of an olefin according to the present invention include a method for obtaining a solid catalyst component for polymerization of an olefin by sequentially performing the following steps:

a first step of charging a vessel with phthalic acid ester compounds (A), a dialkoxymagnesium, a titanium halide, and one or two or more hydrocarbon solvents selected from a linear hydrocarbon or branched aliphatic hydrocarbon, an alicyclic hydrocarbon and an aromatic hydrocarbon and mixing them with a stirrer or the like, and bringing them into contact with each other, thereby obtaining a first contact product;

a second step of charging the vessel containing the first contact product with diether compounds (B) and one or two or more hydrocarbon solvents selected from a linear hydrocarbon or branched aliphatic hydrocarbon, an alicyclic hydrocarbon and an aromatic hydrocarbon and mixing them with a stirrer or the like, and bringing them into contact with each other, thereby obtaining a second contact product, and then washing this second contact product with one or two or more hydrocarbon solvents selected from a linear hydrocarbon or branched aliphatic hydrocarbon, an alicyclic hydrocarbon and an aromatic hydrocarbon; and a third step of charging the vessel containing the washed second contact product with a halogen-containing titanium compound, thereby obtaining a contact product, then washing the obtained contact product, further charging phthalic acid ester compounds (A), a titanium halide and one or two or more hydrocarbon solvents selected from a linear hydrocarbon or branched aliphatic hydrocarbon, an alicyclic hydrocarbon and an aromatic hydrocarbon to the washed contact product and mixing them with a stirrer or the like, bringing them into contact with each other, thereby obtaining a third contact product, and then washing this third contact product with one or two or more hydrocarbon solvents selected from a linear hydrocarbon or branched aliphatic hydrocarbon, an alicyclic hydrocarbon and an aromatic hydrocarbon.

In the method for producing a solid catalyst component for polymerization of an olefin according to the present invention, it is presumed that, by using the phthalic acid ester compounds (A) in the first and third steps and using the diether compounds (B) in the second step, the ratio represented by the entire molar amount of the phthalic acid ester compounds (A)/the entire molar amount of the diether compounds (B) in the solid catalyst component for polymerization of an olefin to be obtained can be readily controlled within the range, which will be mentioned below, and each of the phthalic acid ester compounds (A) and diether compounds (B) in the solid catalyst component for polymerization of an olefin can be readily carried in an optimal amount at an optimal location on a carrier.

As a result, by using the solid catalyst component for polymerization of an olefin obtained by the production method according to the present invention, upon forming a polymer of an olefin, active species that are capable of producing a polymer of an olefin with high stereoregularity and a low content of olefin oligomers can be formed with high efficiency.

For this reason, according to the production method according to the present invention a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

Through the production method according to the present invention, a solid catalyst component for polymerization of an olefin according to the present invention, which will be mentioned below, can be obtained. The details of the solid catalyst component for polymerization of an olefin obtained through the production method according to the present invention are as mentioned below.

According to the present invention, a method for conveniently producing a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

Next, a solid catalyst component for polymerization of an olefin according to the present invention will be described.

The solid catalyst component for polymerization of an olefin according to the present invention is characterized in that it is obtained by sequentially performing the following steps:

(i) a first step of bringing one or two or more compounds selected from phthalic acid ester compounds (A) represented by the following general formula (1), a magnesium compound and a halogen-containing titanium compound into contact with each other, thereby obtaining a first contact product:

$$(R^1)_k C_6 H_{4-k}(COOR^2)(COOR^3) \qquad (1)$$

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;

(ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

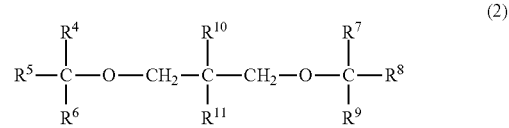

$$(2)$$

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product.

The solid catalyst component for polymerization of an olefin according to the present invention is expressed by a production method therefor, and the details of such a production method are as described in detail in the description of the method for producing a solid catalyst component for polymerization of an olefin according to the present invention.

The solid catalyst component for polymerization of an olefin according to the present invention is preferably a solid catalyst component for polymerization of an olefin, comprising titanium, magnesium, halogen and an internal electron-donating compound, wherein:

the internal electron-donating compound comprises one or two or more compounds selected from phthalic acid ester compounds (A) represented by the following general formula (1):

$(R^1)_k C_6 H_{4-k}(COOR^2)(COOR^3)$      (1)

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, each $R^1$ may be the same as or different from each other, and one or two or more compounds selected from diether compounds (B) represented by the following general formula (2):

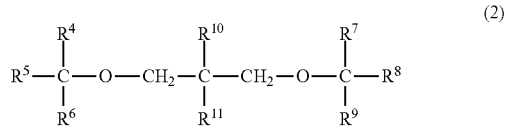

(2)

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;

the total amount of the phthalic acid ester compounds (A) and the diether compounds (B) per g of the solid catalyst component for polymerization of an olefin is 0.5 to 1.2 mmol; and the ratio represented by the entire molar amount of the phthalic acid ester compounds (A)/the entire molar amount of the diether compounds (B) is 0.5 to 1.2.

The solid catalyst component for polymerization of an olefin according to the present invention comprises, as essential components, magnesium, titanium, halogen, and the phthalic acid ester compounds (A) represented by the above general formula (1) and the diether compounds (B) represented by the above general formula (2), which are each an electron-donating compound.

In the solid catalyst component for polymerization of an olefin according to the present invention, examples of the halogen that is included along with magnesium, titanium and the electron-donating compound include, for example, fluorine, chlorine, bromine and iodine. Among the above, chlorine, bromine or iodine is preferable, and chlorine or iodine is more preferable.

In addition, the contents of titanium, magnesium, halogen, the phthalic acid ester compounds (A) and the diether compounds (B) in the solid catalyst component for polymerization of an olefin according to the present invention are not particularly specified as long as the effects of the present invention are achieved.

In the solid catalyst component for polymerization of an olefin according to the present invention, the total amount of the phthalic acid ester compounds (A) and the diether compounds (B) per g of the solid catalyst component for polymerization of an olefin is preferably 0.5 to 1.2 mmol, more preferably 0.6 to 1.2 mmol, and still more preferably 0.8 to 1.2 mmol.

When the total amount of the phthalic acid ester compounds (A) and the diether compounds (B) per g of the solid catalyst component for polymerization of an olefin is within the range described above, an optimal amount of titanium can be immobilized on the surface of a carrier for maintaining the catalytic activity at a high level.

In the solid catalyst component for polymerization of an olefin according to the present invention, the ratio represented by the entire molar amount of the phthalic acid ester compounds (A)/the entire molar amount of the diether compounds (B) is preferably 0.5 to 1.2, more preferably 0.5 to 1.0, and still more preferably 0.5 to 0.8.

In the solid catalyst component for polymerization of an olefin according to the present invention, when the ratio represented by the entire molar amount of the phthalic acid ester compounds (A)/the entire molar amount of the diether compounds (B) is within the range described above, each of the phthalic acid ester compounds (A) and diether compounds (B) is carried in an optimal amount at an optimal location on a carrier. By using such a solid catalyst component for polymerization of an olefin, upon forming a polymer of an olefin, active species that are capable of producing a polymer of an olefin with high stereoregularity and a low content of olefin oligomers can be formed with high efficiency.

For this reason, according to the present invention, a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

In the solid catalyst component for polymerization of an olefin according to the present invention, the content of titanium is preferably 0.1 to 10% by weight, more preferably 0.5 to 8.0% by weight, and still more preferably 1.0 to 8.0% by weight.

In the solid catalyst component for polymerization of an olefin according to the present invention, the content of magnesium is preferably 10 to 70% by weight, more preferably 10 to 50% by weight, still more preferably 15 to 40% by weight, and further preferably 15 to 25% by weight.

In the solid catalyst component for polymerization of an olefin according to the present invention, the content of halogen is preferably 20 to 84.2% by weight, more preferably 30 to 80% by weight, still more preferably 40 to 75% by weight, and further preferably 45 to 75% by weight.

In the solid catalyst component for polymerization of an olefin according to the present invention, the content of the phthalic acid ester compounds (A) is preferably 3.3 to 40.9% by weight, more preferably 3.8 to 30.1% by weight, and still more preferably 3.8 to 21.4% by weight.

In the solid catalyst component for polymerization of an olefin according to the present invention, the content of the diether compounds (B) is preferably 2.4 to 20% by weight, more preferably 3.0 to 18.0% by weight, and still more preferably 4.0 to 17.0% by weight.

In this application document, the content ratio of titanium included in the solid catalyst component for polymerization of an olefin refer to values measured in accordance with the method (oxidation reduction titration) described in JIS 8311-1997 "Method for determination of titanium in titanium ores".

In this application document, the content ratio of halogen included in the solid catalyst component for polymerization of an olefin refers to a value measured through the silver nitrate titration method by treating the solid catalyst component for polymerization of an olefin with a mixed solution of sulfuric acid and pure water to obtain an aqueous solution, then separating a predetermined amount of the aqueous solution, and titrating halogen with a silver nitrate standard solution.

In the present specification, the content or content ratio of the internal electron-donating compound such as the phthalic acid ester compounds (A) or diether compounds (B) included in the solid catalyst component for polymerization of an olefin refers to a value obtained by hydrolyzing the solid catalyst for polymerization of an olefin, then extracting the internal electron-donating compound with an aromatic solvent, and measuring this solution through the gas chromatography with FID (flame ionization detector, hydrogen flame ionization detector).

The solid catalyst component for polymerization of an olefin according to the present invention can be suitably produced through the production method according to the present invention.

According to the present invention, a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

Next, a catalyst for polymerization of an olefin according to the present invention will be described.

The catalyst for polymerization of an olefin according to the present invention is characterized in that it comprises:
(I) the solid catalyst component for polymerization of an olefin according to the present invention; and
(II) one or two or more organoaluminum compounds selected from the following general formula (3):

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other.

The details of (I) the solid catalyst component for polymerization of an olefin according to the present invention constituting the catalyst for polymerization of an olefin according to the present invention are as mentioned above.

In the catalyst for polymerization of an olefin according to the present invention, (II) the organoaluminum compounds are represented by the following general formula (3):

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other.

Specific examples of such (II) organoaluminum compounds include one or two or more selected from a trialkylaluminum such as triethylaluminum, triisopropylaluminum, tri-n-butylaluminum, tri-n-hexylaluminum and triisobutylaluminum; an alkylaluminum halide such as diethylaluminum chloride and diethylaluminum bromide; and diethylaluminum hydride. One or two or more selected from an alkylaluminum halide such as diethylaluminum chloride; and a trialkylaluminum such as triethylaluminum, tri-n-butylaluminum and triisobutylaluminum are preferable, and one or two or more selected from triethylaluminum and triisobutylaluminum are more preferable.

The catalyst for polymerization of an olefin according to the present invention may further comprises (III) an external electron-donating compound along with (I) the solid catalyst component for polymerization of an olefin according to the present invention and (II) the organoaluminum compounds.

Examples of (III) the external electron-donating compound described above include an organic compound that contains an oxygen atom or nitrogen atom, and examples thereof include, for example, an alcohol, a phenol, an ether, an ester, a ketone, an acid halide, an aldehyde, an amine, an amide, a nitrile, an iso-cyanate and an organosilicon compound. In particular, examples thereof include an organosilicon compound that has a Si—O—C bond or an aminosilane compound that has a Si—N—C bond.

Among the above, an ester such as ethyl benzoate, ethyl p-methoxybenzoate, ethyl p-ethoxybenzoate, methyl p-toluate, ethyl p-toluate, methyl anisate and ethyl anisate; a 1,3-diether; an organosilicon compound that includes a Si—O—C bond; and an aminosilane compound that includes a Si—N—C bond are preferable, and an organosilicon compound that includes a Si—O—C bond; an aminosilane compound that includes a Si—N—C bond; and a 1,3-diether are particularly preferable.

In the catalyst for polymerization of an olefin according to the present invention, as (III) the external electron-donating compound, it is preferable that (III) the external electron-donating compound described above be one or two or more selected from:
diether compounds (B) represented by the following general formula (2):

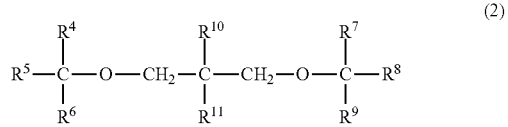

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;

organosilicon compounds represented by the following general formula (4):

$$R^{13}_q Si(OR^{14})_{4-q} \qquad (4)$$

wherein $R^{13}$ represents any of an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms and a dialkylamino group having 1 to 12 carbon atoms; q is an integer of 0≤q≤3 and when q is 2 or more, a plurality of $R^{13}$ may be the same as or different from each other; and $R^{14}$ represents an alkyl group having 1 to 4 carbon atoms, a cycloalkyl group having 3 to 6 carbon atoms, a phenyl group, a vinyl group, an allyl group or an aralkyl group, and when a plurality of $R^{14}$ is present, a plurality of $R^{14}$ may be the same as or different from each other; and organosilicon compounds represented by the following general formula (5):

$$(R^{15}R^{16}N)_s SiR^{17}_{4-s} \qquad (5)$$

wherein $R^{15}$ and $R^{16}$ each represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, and may be the same as or different from each other, or may be bonded to each other to form a ring; $R^{17}$ represents a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group and a derivative thereof, and when a plurality of $R^{17}$ is present, a plurality of $R^{17}$ may be the same as or different from each other; and s is an integer of 1 to 3, and a plurality of the $R^{15}R^{16}N$ groups is present, a plurality of the $R^{15}R^{16}N$ groups may be the same as or different from each other.

When the external electron-donating compound is diether compounds (B) represented by the general formula (2), the details of such diether compounds (B) are as mentioned above.

Examples of the organosilicon compounds represented by the general formula (4) and the general formula (5) may include a phenylalkoxysilane, an alkylalkoxysilane, a phenylalkylalkoxysilane, a cycloalkylalkoxysilane, an alkyl(cycloalkyl)alkoxysilane, an (alkylamino)alkoxysilane, an alkyl(alkylamino)alkoxysilane, a cycloalkyl(alkylamino)alkoxysilane, a tetraalkoxysilane, a tetrakis(alkylamino)silane, an alkyltris(alkylamino)silane, a dialkylbis(alkylamino)silane, a trialkyl(alkylamino)silane.

Specific examples of the organosilicon compounds represented by the general formula (4) and the general formula (5) include phenyltrimethoxysilane, t-butyltrimethoxysilane, di-iso-propyldimethoxysilane, iso-propyl-iso-butyldimethoxysilane, di-iso-pentyldimethoxysilane, bis(2-ethylhexyl)dimethoxysilane, t-butylmethyldimethoxysilane, t-butylethyldimethoxysilane, dicyclopentyldimethoxysilane, dicyclohexyldimetoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, dicyclohexylbis(ethylamino)silane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane and ethyl(isoquinolino)dimethoxysilane.

In particular, as the organosilicon compounds represented by the general formula (4) and the general formula (5), phenyltrimethoxysilane, t-butylmethyldimethoxysilane, t-butylethyldimethoxysilane, di-iso-propyldimethoxysilane, iso-propyl-iso-butyldimethoxysilane, di-iso-pentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, dicyclohexylbis(ethylamino)silane, dicyclopentylbis(ethylamino)silane, bis(perhydroisoquinolino)dimethoxysilane, diethylaminotriethoxysilane and the like are preferable.

In addition, as (III) the external electron-donating compound described above, two or more among the diether compounds represented by the above general formula (2), the organosilicon compounds represented by the general formula (4), and the organosilicon compounds represented by the general formula (5) may be selected and used in combination.

In the catalyst for polymerization of an olefin according to the present invention, the content ratio of each component is arbitrary and is not particularly limited as long as it does not affect the effects of the present invention.

The catalyst for polymerization of an olefin according to the present invention comprises preferably 1 to 2000 mol of, and more preferably 50 to 1000 mol of (II) the organoaluminum compounds described above per mol of titanium atoms in (I) the solid catalyst component for polymerization of an olefin described above.

In addition, the catalyst for polymerization of an olefin according to the present invention comprises preferably 0.002 to 10 mol of, more preferably 0.01 to 2 mol of, and still more preferably 0.01 to 0.5 mol of (III) the external electron-donating compound described above per mol of (II) the organoaluminum compounds described above.

According to the present invention, a catalyst for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

Next, a method for producing a catalyst for polymerization of an olefin according to the present invention will be described.

The method for producing a catalyst for polymerization of an olefin according to the present invention is characterized in that a contact product is obtained by bringing the followings into contact with each other:

(I) the solid catalyst component for polymerization of an olefin according to the present invention; and (II) one or two or more organoaluminum compounds selected from the following general formula (3):

$$R^{12}_p AlQ_{3-p} \qquad (3)$$

wherein p is a real number of 0<p≤3; $R^{12}$ represents an alkyl group having 1 to 6 carbon atoms, and when a plurality of $R^{12}$ is present, a plurality of $R^{12}$ may be the same as or different from each other; and Q is a hydrogen atom or halogen, and when a plurality of Q is present, a plurality of Q may be the same as or different from each other.

The details of (I) the solid catalyst component for polymerization of an olefin according to the present invention and (II) the organoaluminum compounds represented by the general formula (3) are as mentioned above.

In the method for producing a catalyst for polymerization of an olefin according to the present invention, it is preferable that a contact product be obtained by bringing not only (I) the solid catalyst component for polymerization of an olefin according to the present invention and (II) the organoaluminum compounds represented by the general formula (3), but also (III) an external electron-donating compound into contact with each other.

The details of (III) the external electron-donating compound are as mentioned above.

In the method for producing a catalyst for polymerization of an olefin according to the present invention, the catalyst may be prepared by bringing (I) the solid catalyst component for polymerization of an olefin according to the present invention, (II) the organoaluminum compounds represented by the general formula (3) and (III) the external electron-donating compound optionally used into contact in the absence of an olefin, or as mentioned below, the contact product may be obtained by bringing them into contact in the presence of an olefin (in the polymerization system). It is preferable that the contact product be obtained by bringing them into contact in the presence of an olefin (in the polymerization system).

According to the present invention, a method for conveniently producing a catalyst for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided.

Next, a method for producing a polymer of an olefin according to the present invention will be described.

The method for producing a polymer of an olefin according to the present invention is characterized in that polymerization of an olefin is carried out by using the catalyst for polymerization of an olefin according to the present invention.

In the method for producing a polymer of an olefin according to the present invention, an objective polymer of an olefin can be produced by carrying out homopolymerization or copolymerization of olefins by using the catalyst for polymerization of an olefin according to the present invention.

Examples of the olefins include ethylene, propylene, 1-butene, 1-pentene, 4-methyl-1-pentene and vinylcyclohexane, and one of these olefins may be used, or two or more of them may be used. As the olefin, one or two or more selected from ethylene, propylene and 1-butene are preferable, and propylene is more preferable.

When polymerization of propylene is carried out, copolymerization with another olefin may also be carried out. Examples of the olefins to be copolymerized include ethylene, 1-butene, 1-pentene, 4-methyl-1-pentene and vinylcyclohexane, and one of them or two or more of them may be used. As the olefin, one or two or more selected from ethylene and 1-butene are preferable.

The details of the catalyst for polymerization of an olefin according to the present invention, which is to be used for the method for producing a polymer of an olefin according to the present invention, are as mentioned above.

The ratio of constituents of the catalyst for polymerization of an olefin to be used for polymerization of an olefin is arbitrary and is not particularly limited as long as it does not affect the effects of the present invention.

Normally, the amount of (II) the organoaluminum compounds constituting the catalyst for polymerization of an olefin described above is preferably 1 to 2000 mol, and more preferably 50 to 1000 mol per mol of titanium atoms in (I) the solid catalyst component for polymerization of an olefin. In addition, the amount of (III) the external electron-donating compound constituting the catalyst for polymerization of an olefin described above is preferably 0.002 to 10 mol, more preferably 0.01 to 2 mol of, and still more preferably 0.01 to 0.5 mol per mol of (II) the organoaluminum compounds.

In the method for producing a polymer of an olefin according to the present invention, it is preferable that, while (I) the solid catalyst component for polymerization of an olefin according to the present invention, (II) the organoaluminum compounds represented by the general formula (3) and (III) the external electron-donating compound optionally used are brought into contact in the presence of an olefin (in the polymerization system), thereby preparing a contact product (a catalyst for polymerization of an olefin), the olefin be polymerized.

In the method for producing a polymer of an olefin according to the present invention, when an olefin is polymerized while preparing a catalyst for polymerization of an olefin, the order of charging and contact of each component constituting the catalyst for polymerization of an olefin can be arbitrarily selected.

For example, it is desirable that (II) the organoaluminum compounds be charged into the polymerization system at first, and then, (I) the solid catalyst component for polymerization of an olefin be charged.

In addition, when a catalyst for polymerization of an olefin that comprises (III) the external electron-donating compound is used, it is desirable that (II) the organoaluminum compounds be charged into the polymerization system at first, (III) the external electron-donating compound be charged next, and then, (I) the solid catalyst component for polymerization of an olefin be charged.

The method for producing a polymer of an olefin according to the present invention can be performed in the presence of or in the absence of an organic solvent. In addition, olefin monomers such as propylene can be used either in a gaseous state or in a liquid state.

In the method for producing a polymer of an olefin according to the present invention, the polymerization temperature is preferably 200° C. or lower, and more preferably 100° C. or lower.

In the method for producing a polymer of an olefin according to the present invention, the polymerization pressure is preferably 10 MPa or less, and more preferably 5 MPa or less.

In addition, the method for producing a polymer of an olefin according to the present invention can be either continuous polymerization method or batch polymerization method. Furthermore, the polymerization reaction may be carried out in one stage or may be carried out in two or more stages.

In addition, in the method for producing a polymer of an olefin according to the present invention, upon polymerization of an olefin using the catalyst for polymerization of an olefin according to the present invention (also referred to as the present polymerization), in order to further improve the catalytic activity, the stereoregularity, and the particle properties of the polymer to be produced, it is preferable to carry out preliminary polymerization prior to the present polymerization, and at the time of preliminary polymerization, a monomer such as an olefin that is the same as those for the present polymerization or styrene can be used.

Upon carrying out the preliminary polymerization, the order of contact of each component constituting the catalyst for polymerization of an olefin described above and a monomer (olefin) is arbitrary, but preferably, it is preferable that (II) the organoaluminum compounds be charged at first into the preliminary polymerization system that has been set to an inert gas atmosphere or an olefin gas atmosphere, (I) the solid catalyst component for polymerization of an olefin according to the present invention be charged next and brought into contact, and then an olefin such as propylene be brought into contact alone, or a mixture of olefins such as propylene and one or two or more of other olefins be brought into contact.

When (III) the external electron-donating compound is further charged into the preliminary polymerization system in the preliminary polymerization described above, it is preferable that (II) the organoaluminum compounds be charged at first into the preliminary polymerization system that has been set to an inert gas atmosphere or an olefin gas atmosphere, (III) the external electron-donating compound be charged next and brought into contact, (I) the solid catalyst component for polymerization of an olefin according to the present invention be further brought into contact, and then an olefin such as propylene be brought into contact alone, or a mixture of olefins such as propylene and one or two or more of other olefins be brought into contact.

Note that, when the preliminary polymerization is carried out in combination with (III) the external electron-donating compound, a method is desirable in which (II) the organoaluminum compounds are charged at first into the preliminary polymerization system that has been set to an inert gas atmosphere or an olefin gas atmosphere, (III) the external electron-donating compound is brought into contact next, (I) the solid catalyst component for polymerization of an olefin is further brought into contact, and then an olefin such as propylene or a mixture of propylene and one or two or more of other olefins is brought into contact.

In the case of producing a propylene block copolymer, the production is carried out through multistage polymerization in two or more stages, and normally, the copolymer can be obtained by polymerizing propylene using the catalyst for polymerization at the first stage and copolymerizing ethylene and propylene at the second stage. Also, an α-olefin other than propylene can be polymerized together or alone at the second stage or at the time of subsequent polymerization. Examples of the α-olefin include ethylene, 1-butene, 4-methyl-1-pentene, vinylcyclohexane, 1-hexene and 1-octene.

Specifically, at the first stage, polymerization is carried out by adjusting the polymerization temperature and time such that the proportion of the polypropylene part is 20 to 80% by weight, and then, at the second stage, ethylene and propylene or another α-olefin are introduced and polymerization is carried out such that the proportion of the rubber part such as an ethylene-propylene rubber (EPR) is 20 to 80% by weight. The polymerization temperatures at the first stage and the second stage are both preferably 200° C. or lower, and more preferably 100° C. or lower. The polymerization pressure is preferably 10 MPa or less, and more preferably 5 MPa or less. In addition, the polymerization time at each polymerization stage, or the residence time in the case of continuous polymerization is normally 1 minute to 5 hours.

Examples of the polymerization method include a slurry polymerization method in which a solvent of an inert hydrocarbon compound such as cyclohexane and heptane is used, a bulk polymerization method in which a solvent such as liquefied propylene is used, and a gas phase polymerization method in which a solvent is substantially not used. Examples of the preferable polymerization method may include the bulk polymerization method and the gas phase polymerization method.

According to the present invention, a method for producing an olefin polymer with an excellent bulk density and a low content of olefin oligomers under a polymerization activity equivalent to or higher than that of the case using a solid catalyst component in which a phthalic acid ester compound or diether compound is used as an internal electron-donating compound can be provided.

EXAMPLES

Hereinafter, the present invention will be specifically described by contrasting Examples with Comparative Examples, but the present invention is not limited to the following Examples and Comparative Examples.

In addition, the following component analysis, physical property evaluation and polymerization evaluation were measured by the following methods, respectively.
(Method for Measuring the Content of Titanium)

The content of titanium in the solid catalyst component for polymerization of an olefin was measured in accordance with JIS 8311-1997 "Method for determination of titanium in titanium ores" (oxidation-reduction titration).
(Method for Measuring the Content and Number of Moles of the Internal Electron-Donating Compound)

The content of the internal electron-donating compound in the solid catalyst component for polymerization of an olefin was measured using gas chromatography (GC-2014, manufactured by Shimadzu Corporation) under the following measurement conditions.

In addition, the number of moles of the internal electron-donating compound per g of the solid catalyst component for polymerization of an olefin was determined using a calibration curve measured based on a standard solution of the internal electron-donating compound when the content of the internal electron-donating compound was measured.

<Measurement Conditions>
Column: capillary column (I.D. 0.32 mm×Length 30 m df 1.00 μm InertCap1, manufactured by GL Sciences Inc.)
Detector: FID (flame ionization detector, hydrogen flame ionization detector)
Carrier gas: helium, flow rate 7 mL/min
Measurement temperature: vaporizing chamber 280° C., column 225° C., detector 280° C., or vaporizing chamber 265° C., column 180° C., detector 265° C.
(Method for Measuring the Particle Size Distribution of the Solid Catalyst Component for Polymerization of an Olefin)

Using a laser diffraction particle size distribution measuring apparatus (manufactured by Malvern Panalytical Ltd., Mastersizer 3000), the solid catalyst component was dispersed in an air stream with a dispersion pressure of 0.4 bar and measurement was carried out twice by automatic measurement, thereby measuring the particle size distribution.

In each measurement, the particle diameter at a cumulative volume fraction of 10% (D10), the particle diameter at a cumulative volume fraction of 50% (D50) and the particle diameter at a cumulative volume fraction of 90% (D90) were determined, and the respective average values were defined as D10, D50 and D90 for the obtained solid catalyst component for polymerization of an olefin.

In addition, from the values of D10, D50 and D90 described above, SPAN was calculated from the following formula (6).

$$SPAN = (D90-D10)/D50 \quad (6)$$

Furthermore, the abundance (% by volume) of particles of 111 μm or larger (coarse powder) was determined from the particle size distribution described above.

(Method for Measuring the PP Polymerization Activity (Polymerization Activity Per g of the Solid Catalyst Component))

The polymerization activity (PP polymerization activity) per g of the solid catalyst component for polymerization of an olefin was calculated by the following formula (α). In other words, the PP polymerization activity indicates the amount (g) of the polymer to be produced per g of the solid catalyst component for polymerization of an olefin and per hour of the polymerization time.

$$\text{PP polymerization activity (g-PP/(g-cat·time))} = \text{(the amount of the polymer to be produced (g)/(the solid catalyst component (g)·1 hour))} \quad (\alpha)$$

(The Bulk Density (BD) of the Polymer)

The bulk density (BD) of the obtained polymer was measured in accordance with JIS K-6721:1997.

(Method for Measuring the Amount of Oligomers)

A soxhlet extractor was charged with 5.0 g of an undried polymer (polypropylene) obtained through homopolypropylene polymerization and 100 mL of chloroform. By setting the external temperature at the boiling point of chloroform (about 80° C.) or higher, while maintaining the temperature of chloroform at the extraction part below the boiling point (60° C.), the polymer was extracted over 4 hours. Thereafter, the liquid temperature of the extraction liquid was cooled to 23° C., and the amounts of oligomeric components (C6 to C21) contained in the extraction liquid were determined using gas chromatography (GC-2014, manufactured by Shimadzu Corporation) with 2,4-dimethylheptane as the reference substance.

Example 1

<Preparation of the Solid Catalyst Component for Polymerization of an Olefin>

(i) Into a flask with an internal volume of 500 mL that was equipped with a stirring device and replaced with nitrogen gas, 20 g (175 mmol) of diethoxymagnesium, 140 mL of toluene, 40 mL of titanium tetrachloride and 17.3 mmol (4.3 g) of dipropyl phthalate were added, thereby obtaining a first contact product.

(ii) The temperature of the first contact product described above was elevated, and in the middle of the temperature elevation at 90° C., 16.8 mmol (3.6 g) of 2-isopropyl-2-isopentyl-1,3-dimethoxypropane was added. The temperature was further elevated to 113° C. and the reaction was allowed for 180 minutes at a state of retaining the same temperature. After the reaction was completed, a second contact product, which was the reaction product, was washed four times with 187 mL of toluene at 100° C.

(iii) Next, to the washed second contact product described above, 200 mL of a new toluene solution containing 15 vol % of titanium tetrachloride was added, and the temperature was elevated to 100° C. The resultant mixture was stirred and allowed to react for 120 min, and an obtained contact product was washed once with toluene at 108° C. Next, to the washed contact product described above, 200 mL of a new toluene solution containing 10 vol % of titanium tetrachloride and 2.0 mmol (0.5 g) of dipropyl phthalate was added, and the temperature was elevated to 108° C. The resultant mixture was stirred and allowed to react for 60 min, and after the reaction, an obtained third contact product was washed twice with toluene at 100° C. Thereafter, the third contact product was washed seven times with 151 mL of n-heptane at 60° C., and through the solid-liquid separation, a solid catalyst component for polymerization of an olefin was obtained.

The results of component analysis and physical property evaluation of the obtained solid catalyst component for polymerization of an olefin are shown in Table 1 and Table 2, respectively.

Note that, in Example 1, dipropyl phthalate was used as a phthalate (A) and 2-isopropyl-2-isopentyl-1,3-dimethoxypropane was used as a diether (B) among internal electron-donating compounds.

<Formation of the Catalyst for Polymerization of an Olefin and Formation of a Propylene Homopolymer>

Into an autoclave with an internal volume of 2.0 liters that was equipped with a stirrer and replaced with nitrogen gas, 1.32 mmol of triethylaluminum, 0.13 mmol of cyclohexylmethyldimethoxysilane (CMDMS) and 0.0026 mmol (in terms of titanium atoms) of the solid catalyst component described above were charged, thereby forming an catalyst for polymerization of an olefin.

Thereafter, 3.0 liters of hydrogen gas and 1.4 liters of liquefied propylene were charged. After carrying out preliminary polymerization at 20° C. for 5 minutes, the temperature was elevated, and a polymerization reaction was carried out at 70° C. for 1 hour, thereby obtaining a propylene homopolymer.

The results of polymerization evaluation and evaluation of the amount of oligomers of the obtained propylene homopolymer are shown in Table 3.

Example 2

A solid catalyst component for polymerization of an olefin was prepared in the same manner as in Example 1 except that a mixed solution of 0.01 mmol of dicyclopentyldimethoxysilane (DCPDMS) and 0.12 mmol of propyltriethoxysilane (PTES) was used instead of 0.13 mmol of cyclohexylmethyldimethoxysilane (CMDMS), and from this solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Example 3

A solid catalyst component for polymerization of an olefin was prepared in the same manner as in Example 1 except that 0.13 mmol of dicyclopentylbis(ethylamino)silane (DCPBEAS) was used instead of 0.13 mmol of cyclohexylmethyldimethoxysilane (CMDMS) and that 1.5 liters of hydrogen gas was used instead of 3.0 liters of hydrogen gas. From this solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Example 4

A solid catalyst component was prepared in the same manner as in Example 1 except that 16.8 mmol (4.3 g) of 9,9-bis(methoxymethyl)fluorene (BMMF) was used instead of 16.8 mmol of 2-isopropyl-2-isopentyl-1,3-dimethoxypropane, and from this solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 1

A solid catalyst component was prepared in the same manner as in Example 1 except that 16.8 mmol of dipropyl phthalate was used instead of 16.8 mmol of 2-isopropyl-2-isopentyl-1,3-dimethoxypropane in the step (ii) of Example 1, and from this solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 2

A solid catalyst component was prepared in the same manner as in Example 1 except that 17.6 mmol of 2-isopropyl-2-isopentyl-1,3-dimethoxypropane was used instead of 17.3 mmol of dipropyl phthalate in the step (i) of Example 1 and that 200 mL of a toluene solution containing 10 vol % of titanium tetrachloride and 2.0 mmol (0.4 g) of 2-isopropyl-2-isopentyl-1,3-dimethoxypropane was used instead of 200 mL of the toluene solution containing 10 vol % of titanium tetrachloride and 2.0 mmol (0.5 g) of dipropyl phthalate in the step (iii) of Example 1. From this solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 3

(i) Into a flask with an internal volume of 500 mL that was equipped with a stirring device and sufficiently replaced with nitrogen gas, 20 g (175 mmol) of diethoxymagnesium, 140 mL of toluene, 40 mL of titanium tetrachloride and 17.3 mmol (3.7 g) of 2-isopropyl-2-isopentyl-1,3-dimethoxypropane were added, thereby obtaining a first contact product.

(ii) The temperature of the first contact product described above was elevated, and in the middle of the temperature elevation at 90° C., 16.8 mmol (4.3 g) of dipropyl phthalate was added. The temperature was further elevated to 113° C. and the reaction was allowed for 180 minutes at a state of retaining the same temperature, thereby obtaining a second contact product. After the reaction was completed, the second contact product was washed four times with 187 mL of toluene at 108° C.

(iii) Next, to the washed second contact product described above, 200 mL of a toluene solution with a concentration of titanium tetrachloride of 15 vol % was added, and the temperature was elevated to 108° C. The resultant mixture was stirred and allowed to react for 120 min, thereby obtaining a third contact product. After the reaction was completed, the obtained third contact product was washed once with toluene at 100° C.

Next, to the third contact product that had been subjected to the washing treatment described above, 200 mL of a new toluene solution containing 10 vol % of titanium tetrachloride and 2.0 mmol (0.4 g) of 2-isopropyl-2-isopentyl-1,3-dimethoxypropane was added, and the temperature was elevated to 108° C. The resultant mixture was stirred and allowed to react for 60 min.

After the reaction was completed, the obtained product was washed twice with toluene at 100° C. and then washed seven times with 151 mL of n-heptane at 60° C., and through the solid-liquid separation, a solid catalyst component for polymerization of an olefin was obtained.

The results of component analysis and physical property evaluation of the obtained solid catalyst component for polymerization of an olefin are shown in Table 1 and Table 2, respectively.

Subsequently, a catalyst for polymerization of an olefin was formed and a polymerization reaction was carried out in the same manner as in Example 1, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 4

(i) Into a flask with an internal volume of 500 mL that was equipped with a stirring device and sufficiently replaced with nitrogen gas, 20 g (175 mmol) of diethoxymagnesium, 140 mL of toluene, 40 mL of titanium tetrachloride, 17.3 mmol (4.4 g) of 2-isopropyl-2-isopentyl-1,3-dimethoxypropane and 16.8 mmol (4.3 g) of dipropyl phthalate were added, thereby obtaining a first contact product.

(ii) The temperature of the first contact product described above was elevated to 110° C., and the reaction was allowed for 180 minutes at a state of retaining the same temperature, thereby obtaining a second contact product. After the reaction was completed, the obtained second contact product was washed four times with 187 mL of toluene at 100° C.

(iii) Next, to the washed second contact product described above, 200 mL of a toluene solution with a concentration of titanium tetrachloride of 15 vol % was added, and the temperature was elevated to 100° C. The resultant mixture was stirred and allowed to react for 15 min, thereby obtaining a third contact product. After the reaction was completed, the obtained third contact product was washed once with toluene at 100° C.

Next, to the third contact product that had been subjected to the washing treatment described above, 200 mL of a new toluene solution containing 10 vol % of titanium tetrachloride and 2.0 mmol (0.5 g) of dipropyl phthalate was added, and the temperature was elevated to 100° C. The resultant mixture was stirred and allowed to react for 15 min.

After the reaction was completed, the obtained product was washed once with toluene at 100° C. and then washed six times with 151 mL of n-heptane at 60° C., and through the solid-liquid separation, a solid catalyst component for polymerization of an olefin was obtained.

The results of component analysis and physical property evaluation of the obtained solid catalyst component for polymerization of an olefin are shown in Table 1 and Table 2, respectively. Subsequently, a catalyst for polymerization of an olefin was formed and a polymerization reaction was carried out in the same manner as in Example 1, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 5

A solid catalyst component was prepared in the same manner as in Example 1 except that 16.8 mmol of dipropyl phthalate was used instead of 16.8 mmol of 2-isopropyl-2-isopentyl-1,3-dimethoxypropane in the step (ii) of Example 1 and that 200 mL of a toluene solution containing 10 vol % of titanium tetrachloride, 16.8 mmol of dipropyl phthalate and 2.0 mmol (0.4 g) of 2-isopropyl-2-isopentyl-1,3-dimethoxypropane was used instead of 200 mL of the toluene solution containing 10 vol % of titanium tetrachloride and 2.0 mmol (0.5 g) of dipropyl phthalate in the step (iii) of Example 1. From this solid catalyst component, a catalyst for polymerization of an olefin was formed and a polymerization reaction was carried out, thereby obtaining a propylene homopolymer.

The evaluation results at this time are shown in Tables 1 to 3.

Comparative Example 6

A solid catalyst component for polymerization of an olefin was prepared in the same manner as in Example 1 except that, in the step (i) of Example 1, the first contact product was obtained by adding only 20 g (175 mmol) of diethoxymagnesium, 140 mL of toluene and 40 mL of titanium tetrachloride, and that, in the step (ii) of Example 1, the temperature of the first contact product described above was elevated, 17.3 mmol of dipropyl phthalate and 16.8 mmol of 2-isopropyl-2-isopentyl-1,3-dimethoxypropane were added in the middle of the temperature elevation at 80° C., and the temperature was further elevated to 113° C. By using the obtained solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

Comparative Example 7

A solid catalyst component for polymerization of an olefin was prepared in the same manner as in Example 1 except that, in the step (i) of Example 1, the first contact product was obtained by adding 20 g (175 mmol) of diethoxymagnesium, 140 mL of toluene, 40 mL of titanium tetrachloride, 17.3 mmol of dipropyl phthalate and 16.8 mmol of 2-isopropyl-2-isopentyl-1,3-dimethoxypropane, and that, in the step (ii) of Example 1, 2-isopropyl-2-isopentyl-1,3-dimethoxypropane was not added. By using the obtained solid catalyst component, a catalyst for polymerization of an olefin was formed and a polymerization reaction was carried out, thereby obtaining a propylene homopolymer.

For the solid catalyst component for polymerization of an olefin obtained at this time, the results of component analysis and physical property evaluation are shown in Table 1 and Table 2, respectively, and the results of polymerization evaluation and evaluation of the amount of oligomers of the obtained propylene homopolymer are also shown in Table 3.

TABLE 1

| | Component analysis | | | | | | |
|---|---|---|---|---|---|---|---|
| | Content (% by mass) | | | Number of moles (mmol) | | | |
| | Ti | (A) | (B) | (A) | (B) | (A) + (B) | (A)/(B) |
| Example 1 | 1.8 | 7.7 | 10.4 | 0.3 | 0.5 | 0.8 | 0.6 |
| Example 2 | 1.8 | 7.7 | 10.4 | 0.3 | 0.5 | 0.8 | 0.6 |
| Example 3 | 1.8 | 7.7 | 10.4 | 0.3 | 0.5 | 0.8 | 0.6 |
| Example 4 | 2.4 | 9.3 | 16.6 | 0.4 | 0.8 | 1.2 | 0.5 |
| Comparative Example 1 | 2.1 | 13.4 | 0.0 | 0.6 | 0.0 | 0.6 | — |
| Comparative Example 2 | 2.4 | 0.0 | 21.1 | 0.0 | 1.0 | 1.0 | 0.0 |
| Comparative Example 3 | 1.8 | 6.0 | 11.2 | 0.2 | 0.5 | 0.7 | 0.4 |
| Comparative Example 4 | 2.1 | 5.7 | 11.2 | 0.2 | 0.5 | 0.7 | 0.4 |
| Comparative Example 5 | 1.8 | 12.8 | 1.8 | 0.5 | 0.1 | 0.6 | 5.0 |
| Comparative Example 6 | 2.0 | 8.1 | 7.8 | 0.3 | 0.4 | 0.7 | 0.8 |
| Comparative Example 7 | 1.8 | 8.1 | 8.3 | 0.3 | 0.4 | 0.7 | 0.8 |

DESCRIPTION OF ABBREVIATIONS

Ti: titanium in the solid catalyst component for polymerization of an olefin (A): the internal electron-donating compound (phthalic acid ester compound) in the solid catalyst component for polymerization of an olefin . . . dipropyl phthalate (B): the internal electron-donating compound (diether compound) in the solid catalyst component for polymerization of an olefin . . . 2-isopropyl-2-isopentyl-1,3-dimethoxypropane or 9,9-bis(methoxymethyl)fluorene

TABLE 2

| | Particle diameter (μm) | | | Particle size distribution | Amount of coarse powder (% by volume) On 111 μm sieve |
|---|---|---|---|---|---|
| | D10 | D50 | D90 | SPAN | |
| Example 1 | 31.6 | 47.6 | 69.1 | 0.79 | 0.00 |
| Example 2 | 31.6 | 47.6 | 69.1 | 0.79 | 0.00 |
| Example 3 | 31.6 | 47.6 | 69.1 | 0.79 | 0.00 |
| Example 4 | 15.6 | 43.6 | 71.3 | 1.28 | 0.00 |
| Comparative Example 1 | 28.5 | 45.8 | 66.7 | 0.83 | 0.00 |
| Comparative Example 2 | 25.8 | 46.5 | 73.7 | 1.03 | 0.00 |
| Comparative Example 3 | 24.8 | 46.0 | 73.5 | 1.06 | 0.01 |
| Comparative Example 4 | 28.2 | 47.1 | 71.9 | 0.93 | 0.00 |
| Comparative Example 5 | 11.0 | 46.1 | 77.4 | 1.44 | 0.46 |
| Comparative Example 6 | 30.0 | 52.9 | 88.9 | 1.11 | 1.73 |
| Comparative Example 7 | 31.9 | 47.3 | 67.8 | 0.76 | 0.00 |

TABLE 3

| | Polymerization activity (g-PP/g-cat.) | Bulk density (g/mL) | Amount of oligomers (μg/g) |
|---|---|---|---|
| Example 1 | 62,000 | 0.44 | 620 |
| Example 2 | 66,300 | 0.44 | 560 |
| Example 3 | 58,500 | 0.44 | 610 |
| Example 4 | 54,300 | 0.43 | 680 |
| Comparative Example 1 | 61,000 | 0.44 | 1020 |
| Comparative Example 2 | 31,800 | 0.42 | 790 |
| Comparative Example 3 | 62,500 | 0.42 | 730 |
| Comparative Example 4 | 52,600 | 0.42 | 760 |
| Comparative Example 5 | 43,300 | 0.44 | 950 |
| Comparative Example 6 | 62,100 | 0.42 | 750 |
| Comparative Example 7 | 47,600 | 0.44 | 960 |

From Table 1 to Table 3, it is found that, since solid catalyst components according to the present invention were used in Example 1 to Example 4, catalysts for polymerization of an olefin have polymerization activities equivalent to or higher than that of the case using a solid catalyst component in which a phthalic acid ester compound or diether compound is used as an internal electron-donating compound, and an olefin polymer with an excellent bulk density and a low content of olefin oligomers can be produced.

On the other hand, the respective solid catalyst components used in Comparative Example 1 to Comparative Example 7 did not have a diether compound (B) (Comparative Example 1), did not have a phthalic acid ester compound (A) (Comparative Example 2), was obtained with no contact with a phthalic acid ester compound (A) in the first and third steps and with no contact with a diether compound (B) in the second step (Comparative Example 3), were obtained with no contact with a diether compound (B) in the second step (Comparative Example 4, Comparative Example 5), was obtained with no contact with a phthalic acid ester compound (A) in the first step (Comparative Example 6), and was obtained with no contact with a diether compound (B) in the second step (Comparative Example 7).

For this reason, from Table 3, it is found that, in Comparative Example 1 to Comparative Example 7, even if catalysts for polymerization of an olefin have polymerization activities equivalent to or higher than that of the case using a solid catalyst component in which a phthalic acid ester compound or diether compound is used as an internal electron-donating compound, and/or can produce a polymer with a bulk density equivalent to or higher than the above case, the obtained polymers have a large amount of olefin oligomers.

INDUSTRIAL APPLICABILITY

According to the present invention, a solid catalyst component for polymerization of an olefin that has a polymerization activity equivalent to or higher than that of the case using a solid catalyst component in which a phthalic acid ester compound or diether compound is used as an internal electron-donating compound, and that can produce an olefin polymer with an excellent bulk density and a low content of olefin oligomers can be provided, and a method for producing a solid catalyst component for polymerization of an olefin, a catalyst for polymerization of an olefin, a method for producing a catalyst for polymerization of an olefin and a method for producing a polymer of an olefin can also be provided.

The invention claimed is:

1. A solid catalyst component for polymerization of an olefin, obtained by sequentially performing the following steps:
   (i) a first step of bringing one or two or more compounds selected from phthalic acid ester compounds (A) represented by the following general formula (1), a dialkoxymagnesium compound and a halogen-containing titanium compound into contact with each other, thereby obtaining a first contact product:

$(R^1)_k C_6 H_{4-k}(COOR^2 XCOOR^3)$     (1)

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;

(ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

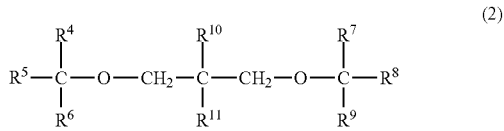

(2)

$$R^5-\underset{R^6}{\overset{R^4}{\underset{|}{\overset{|}{C}}}}-O-CH_2-\underset{R^{11}}{\overset{R^{10}}{\underset{|}{\overset{|}{C}}}}-CH_2-O-\underset{R^9}{\overset{R^7}{\underset{|}{\overset{|}{C}}}}-R^8$$

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and
  (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product,
wherein the solid catalyst component for polymerization of an olefin comprises titanium, magnesium, halogen and an internal electron-donating compound;
the internal electron-donating compound comprises one or two or more compmunds selected from phthalic acid ester compounds (A) represented by the following general formula (1):

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, each $R^1$ may be the same as or different from each other, and one or two or more compounds selected from diether compounds (B) represented by the following general formula (2):

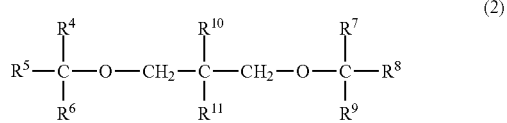

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;
  a total amount of the phthalic acid ester compounds (A) and the diether compounds (B) per g of the solid catalyst component for polymerization of an olefin is 0.5 to 1.2 mmol; and
  a ratio represented by the entire molar amount of the phthalic acid ester compounds (A)/the entire molar amount of the diether compounds (B) is 0.5 to 1.2.
2. A method for producing a solid catalyst component of claim 1 for polymerization of an olefin, comprising the following steps sequentially performed:
  (i) a first step of bringing one or two or more compounds selected from phthalic acid ester compounds (A) represented by the following general formula (1), a magnesium compound and a halogen-containing titanium compound into contact with each other, thereby obtaining a first contact product:

wherein $R^1$ represents an alkyl group having 1 to 8 carbon atoms or a halogen atom; $R^2$ and $R^3$ each represent an alkyl group having 1 to 12 carbon atoms and may be the same as or different from each other; and the number of the substituent $R^1$, k, is 0, 1 or 2, and when k is 2, a plurality of $R^1$ may be the same as or different from each other;
  (ii) a second step of further bringing the first contact product obtained in the step (i) and one or two or more compounds selected from diether compounds (B) represented by the following general formula (2) into contact with each other, thereby obtaining a second contact product, and then washing the obtained second contact product:

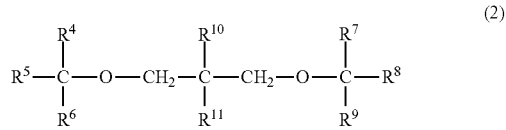

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring; and
  (iii) a third step of bringing the washed second contact product and a halogen-containing titanium compound into contact with each other to obtain a contact product, then washing the obtained contact product, and further bringing the washed contact product, one or two or more compounds selected from phthalic acid ester compounds (A) represented by the above general formula (1) and a halogen-containing titanium compound into contact with each other, thereby obtaining a third contact product.
3. A catalyst for polymerization of an olefin, comprising:
  (I) the solid catalyst component for polymerization of an olefin according to claim 1; and
  (II) one or two or more organoaluminum compounds selected from the following general formula (3):

wherein p is a real number of 0<p≤3; $R^{12}$ represents an alkyl group having 1 to 6 carbon atoms, and when a plurality of $R^{12}$ is present, a plurality of $R^{12}$ may be the same as or different from each other; and Q represents a hydrogen atom or halogen, and when a plurality of Q is present, a plurality of Q may be the same as or different from each other.
4. The catalyst for polymerization of an olefin according to claim/further comprising:
  (III) an external electron-donating compound.
5. The catalyst for polymerization of an olefin according to claim 4, wherein (III) the external electron-donating compound is one or two or more selected from a group consisting of:

diether compounds (B) represented by the following general formula (2):

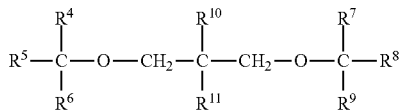
(2)

wherein $R^4$ to $R^9$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other; and $R^{10}$ and $R^{11}$ each represent any of a hydrogen atom, a linear alkyl group having 1 to 6 carbon atoms, a branched alkyl group having 3 to 6 carbon atoms, a cycloalkyl group having 3 to 6 carbon atoms and a phenyl group, and may be the same as or different from each other, or may be bonded to each other to form a ring;

organosilicon compounds represented by the following general formula (4):

$$R^{13}{}_q Si(OR^{14})_{4-q} \qquad (4)$$

wherein $R^{13}$ represents any of an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms and a dialkylamino group having 1 to 12 carbon atoms; q is an integer of $0 \leq q \leq 3$ and when q is 2 or more, a plurality of $R^3$ may be the same as or different from each other; and $R^{14}$ represents an alkyl group having 1 to 4 carbon atoms, a cycloalkyl group having 3 to 6 carbon atoms, a phenyl group, a vinyl group, an allyl group or an aralkyl group, and when a plurality of $R^4$ is present, a plurality of $R^4$ may be the same as or different from each other; and organosilicon compounds represented by the following general formula (5):

$$(R^{15}R^{16}N)_s SiR^{17}{}_{4-s} \qquad (5)$$

wherein $R^5$ and $R^{16}$ each represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms or an aryl group, and may be the same as or different from each other, or may be bonded to each other to form a ring; $R^{17}$ represents a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group and a derivative thereof, and when a plurality of $R^{17}$ is present, a plurality of $R^{17}$ may be the same as or different from each other; and s is an integer of 1 to 3, and a plurality of the $R^{15}R^{16}N$ groups is present, a plurality of the $R^{15}R^{16}N$ groups may be the same as or different from each other.

6. A method for producing a catalyst for polymerization of an olefin, wherein a contact product is obtained by bringing the followings into contact with each other:
(I) the solid catalyst component for polymerization of an olefin according to claim 2; and
(II) one or two or more organoaluminum compounds selected from the following general formula (3):

$$R^{12}{}_p AlQ_{3-p} \qquad (3)$$

wherein p is a real number of $0 < p \leq 3$; $R^{12}$ represents an alkyl group having 1 to 6 carbon atoms, and when a plurality of $R^{12}$ is present, a plurality of $R^{12}$ may be the same as or different from each other; and Q is a hydrogen atom or halogen, and when a plurality of Q is present, a plurality of Q may be the same as or different from each other.

* * * * *